United States Patent Office 3,443,091
Patented May 6, 1969

3,443,091
SINGLE APPARATUS WITH MEANS TO PERFORM A BACK-REFLECTION OR TRANSMISSION DIFFRACTION METHOD OF X-RAY PHOTOGRAPHY
Philip D. Bartlett, Worcester, and Melvin Friedman, Arlington, Mass., assignors to Polaroid Corporation, Cambridge, Mass., a corporation of Delaware
Filed May 2, 1966, Ser. No. 546,756
Int. Cl. G01n 23/02, 23/20; H01j 37/20
U.S. Cl. 250—51.5    6 Claims

ABSTRACT OF THE DISCLOSURE

The present application is concerned with apparatus for permitting a rapid positional interchange of a cassette and a sample specimen holder relative to an X-ray tube to enable, optionally, either a back-reflection or a transmission diffraction method of X-ray photography. In brief, the apparatus includes a single cassette having a central aperture and adapted to both types of diffraction method, a sample specimen holder, individual supporting members for the cassette and specimen holder, means slidably interconnecting the supporting members, attaching means identified with the X-ray tube, and individual manually-releasable attaching means identified with each of the supporting members. The manually-releasable attaching means are complementary to that identified with the X-ray tube, and permit rapid attachment to or release from the latter to make readily possible either type of X-ray photography.

---

Figure 1:
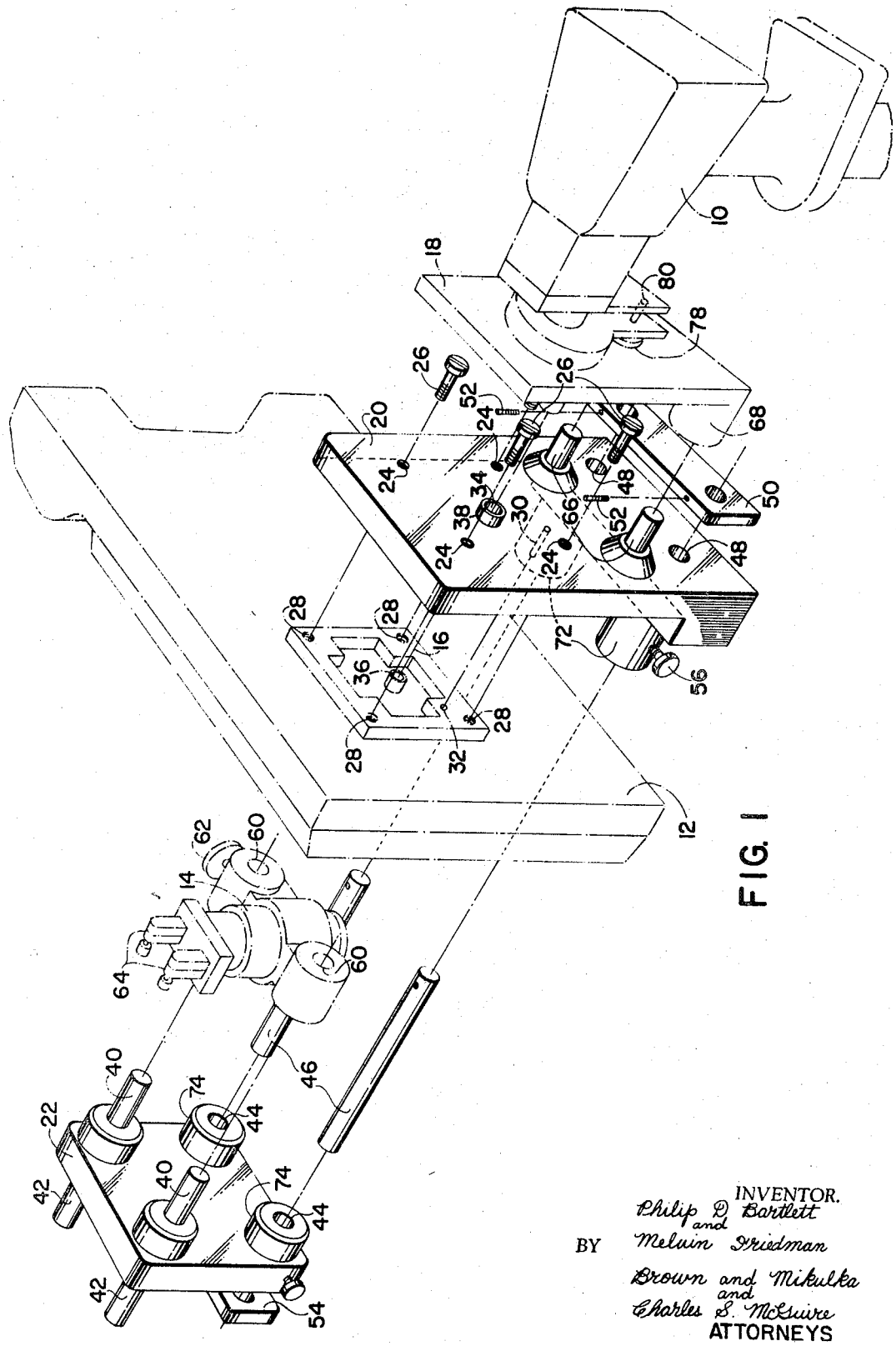

In X-ray diffraction work a sample of material is held at a predetermined distance from a photographic film and an X-ray beam is directed to impinge upon the sample. The beam is reflected back from the sample to the film, or scattered by the sample to impinge upon the film in a pattern indicative of the structure, orientation, etc. of the sample. For example, the sample may be a crystal which deflects the X-ray beam in a pattern dependent upon the crystalline structure. Many types of commercially available X-ray generating equipment are provided with suitable means for supporting a photographic film and sample in predetermined relationship so that the X-ray beam may strike first the sample and then the film in a manner which will yield useful information from the exposure pattern on the film.

X-ray photography of the type described above includes the techniques generally known as front- and back-reflection Laué photography. According to the back-reflection Laué technique a collimated X-ray beam is directed through an opening in the cassette to strike the sample which is positioned on the opposite side of the film from the X-ray source. In the front Laué technique the sample is positioned between the X-ray source and the film. In order to interpret the exposure pattern produced on the film by the deflection of the beam from the sample, it is necessary to know the distance between the sample and the film plane at the time of exposure. It is also sometimes desirable to make exposures with different sample-to-film distances.

It is a principal object of the present invention to provide means for supporting an X-ray cassette and sample holder in predetermined relation to one another and to means for generating an X-ray beam which allows rapid and simple rearrangement to change from front to back reflection Laué photography.

A further object is to provide a positioning and supporting system for an X-ray diffraction cassette and sample holder wherein the distance from the sample to the film plane may be quickly and accurately changed between a plurality of known distances.

A still further object is to provide apparatus for supporting an X-ray cassette and sample holder of previously known design and for positioning the cassette and sample holder in any of a variety of predetermined positions relative to one another and to an X-ray tube, also of conventional design.

Still another object is to provide novel apparatus for mounting and positioning an X-ray cassette, tube and sample holder in such a way as to enhance the versatility of the equipment in making X-ray diffraction exposures.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is an exploded, perspective view of the apparatus of the present invention, also showing in phantom lines certain known elements with which the apparatus may be associated; and FIGS. 2–5 are a series of perspective views of the apparatus of FIG. 1 shown in a number of different positions in which it may be placed for different uses.

Copending U.S. patent application Ser. No. 397,938, filed Sept. 21, 1964 of Herman E. Erikson describes an X-ray cassette which may utilize film of the self-developing type. Cassettes of the type are presently commercially available from Polaroid Corporation, Cambridge, Mass. under the designation Polaroid XR-7 Land diffraction cassettes. Such cassettes are designed to utilize self-developing film in 4 x 5 inch format; film packets of this type are also manufactured and sold by Polaroid Corporation and designated as Types 51, 52, 55, 57 and 58. The apparatus of the present invention is shown in combination with a casette of this type, although it will be understood that the apparatus is capable of supporting other types of cassettes within the scope of the invention. Also shown in the drawings are a sample holder and X-ray tube, having certain other conventional elements associated therewith, of a type available from Siemens America, Inc. (a corporation of the Siemens Groups in Germany) 350 5th Ave., New York, N.Y. It will be further understood that while an appropriate X-ray tube, cassette and sample holder are necessary for practical use of the invention, the latter is not limited to use with the particular form of such conventional apparatus shown in the present drawings. That is, dimensional changes or other structural variations within the scope of the invention may be made as required to provide use of the invention with other forms of cassettes, sample holders and X-ray tubes.

Referring now to the drawings, in FIG. 1 is shown an X-ray tube, cassette and sample holder designated, respectively, by the reference numerals 10, 12 and 14. Since these elements are of conventional, commercially available designs, they are shown in outline form only and the details thereof will be described only insofar as is necessary to a complete understanding of the present invention. X-ray tube 10 includes appropriate means for generating an X-ray beam and for collimating the beam along an axis designated in FIG. 1 by the numeral 16. Additional elements 18 are supported on X-ray tube 10 and may include means for supporting a photographic film for use in certain applications. Although the present invention is not concerned with applications wherein the film is held within elements 18, a portion thereof may be used to assist in connecting and supporting the apparatus of the invention in predetermined relation to X-ray tube 10.

The apparatus of the invention includes first and second support members 20 and 22, respectively, which are shown in the form of generally rectangular plates. Plate 20 includes openings 24 through which screws 26 extend to engage internally threaded openings 28 in a portion of cassette 12. Also, dowel pin 30 may be provided on plate 20 to mate with opening 32 in cassette 12, thus serving to locate the cassette more precisely with respect to plate 20. Pin 30 may be removable or retractable, if desired, so that other cassettes not having an opening in the proper place for receiving pin 30 may be used with the apparatus. Openings 34 and 36 are also provided in plate 20 and cassett 12, respectively, concentrically with axis 16 of the X-ray beam. Plate 20 also includes raised boss 38 into which extends a smaller boss at opening 36 of the casette, thereby serving as an additional locating means. Thus, the X-ray beam may pass through plate 20 and cassette 12 to strike a sample positioned on the opposite side thereof for back Laué photography as explained more fully in connection with FIGS. 2 and 3.

A pair of rods 40 extend rigidly in one direction from plate 22 and a second pair of rods 42 extend rigidly in the opposite direction. Plate 22 also includes a pair of openings 44 extending therethrough. Elongated rods 46 extend slidably through openings 44 in plate 22 and through a similar pair of openings 48 in plate 20. Bar 50 is affixed to the ends of rods 46 which extend through openings 48 in plate 20 by any appropriate means such as pins 52 which extend through the bar and into the rods. The ends of rods 46 which extend through openings 44 in plate 22 are similarly affixed to bar 54. Thus, plates 20 and 22 are movable along bars 46 toward and away from one another, the maximum extent of such movement being limited by bars 50 and 54. The positions of plates 20 and 22 may be selectively fixed upon bars 46 and tightening thumb screws 56 and 58, respectively.

Rods 40 are provided on plate 22 for the purpose of mounting sample holder 14 which is of a type including a pair of openings 60 and receiving rods 40. Screw 62 extends through a wall of the sample holder to engage one of rods 40, thereby fixing the position of sample holder 14 with respect to plate 22. A sample of material to be placed in the path of the X-ray beam may be held between engagement portions 64 of sample holder 14. Other types of conventional engagement members may also be positioned upon the sample holder depending upon the type and size of material under study. The construction of sample holder 14 also permits some adjusting movement of the sample with respect to the axis of the beam.

A pair of rods 66 extend fixedly from one side of plate 20. Rods 66 correspond in size and spacing to rods 42 on plate 22, but the two pairs of rods are disposed in opposite directions. Portions 68 of elements 18 include openings into which either rods 66 or rods 42 may extend, thereby connecting the apparatus of the invention with the cassette and sample holder mounted thereon to the X-ray tube. Thus, when the apparatus is mounted with rods 66 engaged in portions 68, cassette 12 is positioned between tube 10 and sample holder 14; when the apparatus is mounted with rods 42 engaged in portions 68, sample holder 14 is positioned between tube 10 and cassette 12. This provides means for making either front or back Laué exposures without dismounting either the sample holder or cassette.

Figure 2:
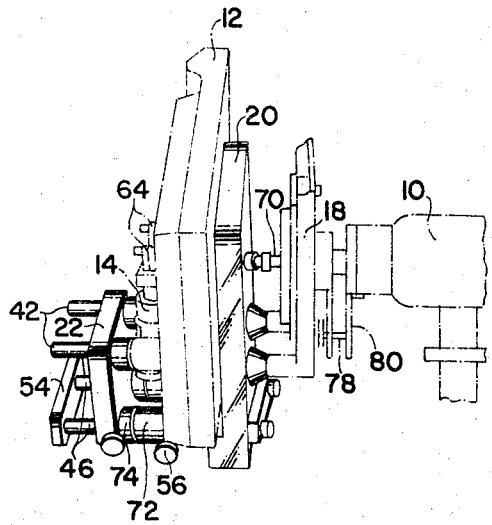

Referring now to FIGS. 2–5, the apparatus is shown in a variety of positions which may aid in an understanding of the functions of the previously described elements. In FIG. 2 the elements are arranged for a back Laué exposure with the sample held relatively close to the film plane. Rods 66 are engaged in portions 68 of the elements associated with X-ray tube 10. In this position it will be noted that collimating tube 70 extends into opening 34 of plate 20. Plates 20 and 22 are moved along rods 46 to a position as close to one another as possible, the minimum distance between the two plates being limited by portions 72 on plate 20 and portions 74 on plate 22. With plates 20 and 22 moved as close together as possible the sample of material held by holder 14 will be positioned at a predetermined, known distance from the film plane within cassette 12.

Figure 3:
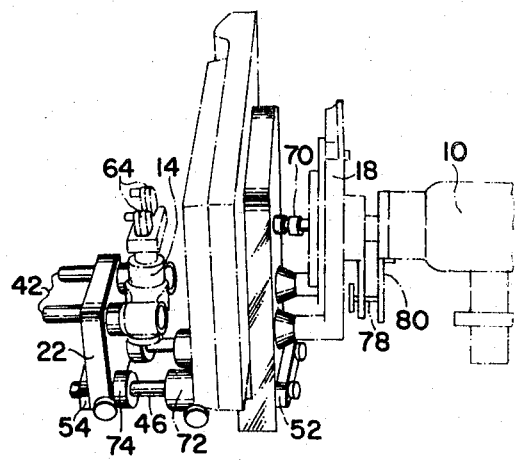

Turning now to FIG. 3, the apparatus remains mounted with respect to tube 10 by engagement of rod 66 in portions 68. Therefore, the elements are still arranged for back Laué exposure. However, plates 20 and 22 have now been moved as far apart as possible, the maximum extent of the relative movement being governed by bars 50 and 54. It may be seen in FIG. 3 that plates 20 and 22 are in engagement with bars 50 and 54, respectively. Hence, in moving from FIG. 2 to FIG. 3, cassette 12 has remained stationary with respect to tube 10 but sample holder 14 has been moved a greater distance away from cassette 12. With the elements in the position shown in FIG. 3 a back Laué exposure may be made with the sample at a second predetermined distance from the film plane. For example, the sample may be positioned at a distance of 3 cm. from the film plane in the FIG. 2 position and 5 cm. in the FIG. 3 position.

Figure 4:
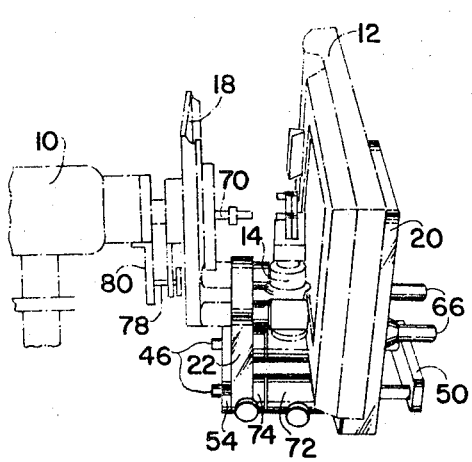
Figure 5:
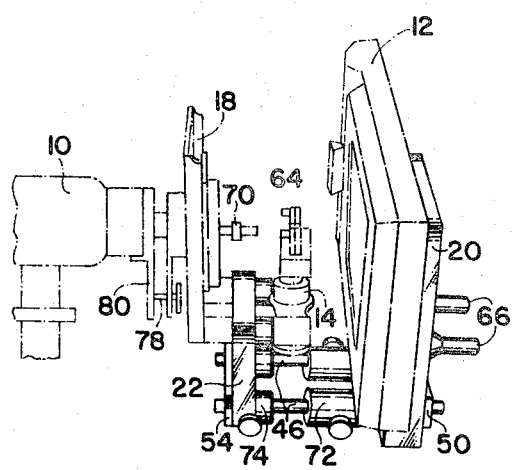

Referring now to FIG. 4 the position of the elements has been reversed by removing rods 66 from portions 68, turning the entire apparatus 180° (in a translatory rather than rotational direction with respect to axis 16 of the X-ray beam) and inserting rods 42 in portions 68. Thus, sample holder 14 is now positioned between X-ray tube 10 and cassette 12 so that front Laué exposures may be made. The elements are also in position for making front Laué exposures as illustrated in FIG. 5, but again the distance between the sample and the film plane has been changed. In FIG. 4, plates 20 and 22 are in the position of closest proximity as governed by portions 72 and 74. In FIG. 5, plates 20 and 22 are as far apart as possible as determined by the fixed positions of bars 50 and 52 on rods 46.

In the conventional form of X-ray apparatus shown in the present drawings elements 18 are connected to tube 10 by means of a pivot joint at 76. The turning moment created by the weight of elements 18 and the apparatus of the present invention connected thereto, maintain the end of adjusting screw 78 in contact with portion 80 of tube 10. Screw 78 provides means for adjusting the angular position of the cassette and sample holder with respect to axis 16 of the X-ray beam.

From the foregoing description it may be seen that the adapter system of the present invention provides means for supporting and positioning a conventional X-ray cassette and sample holder in such manner as to allow convenient and precise repositioning of the elements for a variety of different X-ray diffraction exposures. The elements may be moved to change from front to back Laué exposure merely by removing one pair of rods, or other such engaging means, from engagement with a portion of the tube, or elements associated therewith, and placing a second pair of rods in engagement therewith. Also, the elements may be quickly and easily moved to provide either of two precisely predetermined distances between the sample and the film plane in both the front and back Laué orientations. It will be further noted that the cassette remains stationary with respect to the tube as the sample holder is moved between the two relative positions during back Laué exposures, and the cassette is moved while the sample holder remains stationary during front Laué exposures. That is, the element (cassette or sample holder) nearest the X-ray tube remains stationary as the sample-to-film distance is changed. This situation is desirable in maintaining the optimum intensity of the X-ray beam on the surface of the film since beam intensity decreases with distance in accordance with the inverse square law.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. X-ray apparatus for enabling a rapid positional interchange in the mounting of a cassette and a sample specimen holder relative to support means associated with an X-ray tube for alternatively permitting back reflection and transmission diffraction methods of photographing a sample specimen, said apparatus comprising:
  (a) a first support member having a central beam-transmitting aperture fastened to said X-ray tube, said member including means enabling releasable attachment thereof to complementary attachment means of other components of said apparatus;
  (b) a second support member having a central beam-transmitting aperture and bore means extending through portions thereof at one side of said central aperture;
  (c) a cassette for mounting a film material and having a central beam transmitting aperture adapted to both back reflection and transmission methods of recording;
  (d) means attaching said cassette to said second support member;
  (e) a third support member having bore means extending through given portions thereof;
  (f) a sample specimen holder;
  (g) means mounting said sample specimen holder on said third support member;
  (h) rod means mounted in said bore means of a diameter enabling the selective slidable movement thereon of said second support member and said third support member;
  (i) manually-actuatable retaining means for fixing the longitudinal positions of said second and third support means on said rod means; and
  (j) identical attachment means integral with each of said second and third support members for releasably fastening said attachment means of either of said members optionally to said attachment means of said first support member, so that when said second support member is thereby mounted on said first support member the apparatus is adapted to the performance of said back-reflection diffraction method and when said third support member is mounted on said first support member the system is adapted to said transmission diffraction method.

2. X-ray apparatus, as defined in claim 1, wherein said rod means includes a pair of elongated transversely-spaced rods.

3. X-ray apparatus, as defined in claim 2, wherein is included a pair of bars each having two transversely-spaced apertures formed therein for accepting the extremities of said rods, and retaining means of said bars adapted to bear upon said rods for fixing the positions of said bars thereon adjacent to said extremities, whereby said bars constitute limit stop means relative to the slidable movement of said second and third support members for establishing the maximum spacing therebetween.

4. X-ray apparatus, as defined in claim 1, wherein said attachment means of said first support member is a pair of transversely-spaced apertures formed therein and said attachment means of each of said second and third support members is a pair of integral transversely-spaced rods extending outwardly from principal faces thereof in directions parallel to said bore means, and adapted to be releasably inserted in said pair of apertures.

5. X-ray apparatus, as defined in claim 4, wherein said outwardly-extending rods protrude from said faces which are opposite to the faces against which said cassette and sample specimen holder are positioned.

6. X-ray apparatus, as defined in claim 1, wherein are included integral boss means extending from said second and third support members adjacent to said bore means of each for determining the minimum spacing between said support members.

References Cited

UNITED STATES PATENTS

| 2,904,688 | 9/1959 | Miller | 250—51.5 |
| 2,941,078 | 6/1960 | Montel. | |

OTHER REFERENCES

General Electric Publication 7A–560 entitled General Electric XRD [X-Ray Diffraction] Unit pp. 16–17.

RALPH G. NILSON, *Primary Examiner.*

S. C. SHEAR, *Assistant Examiner.*

U.S. Cl. X.R.

250—52